April 25, 1939.    J. PLÜSCHKE    2,156,192
PLANT FOR WORKING MERCURY ORES
Filed Aug. 20, 1938
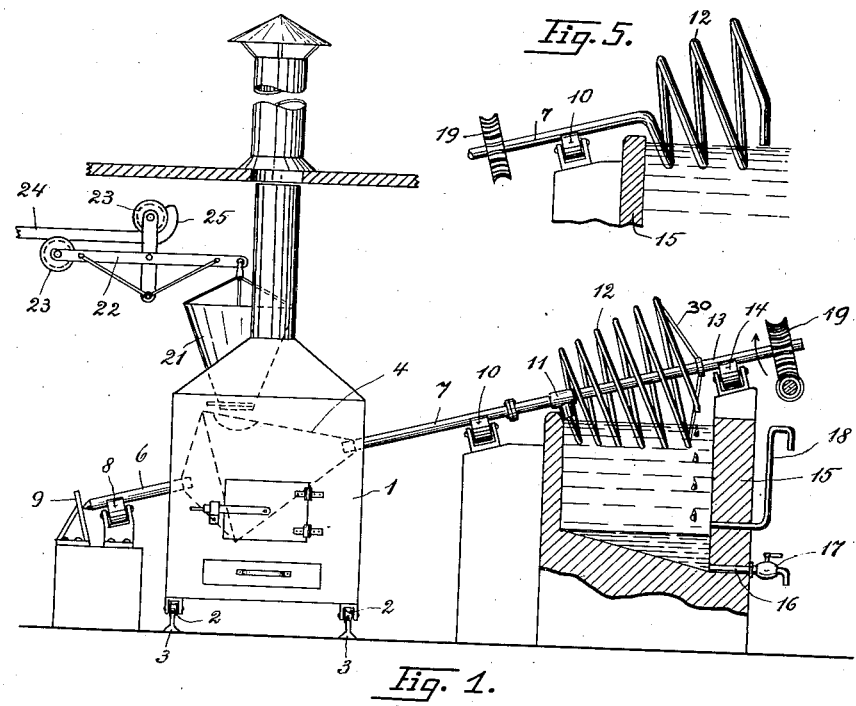
Fig. 5.
Fig. 1.
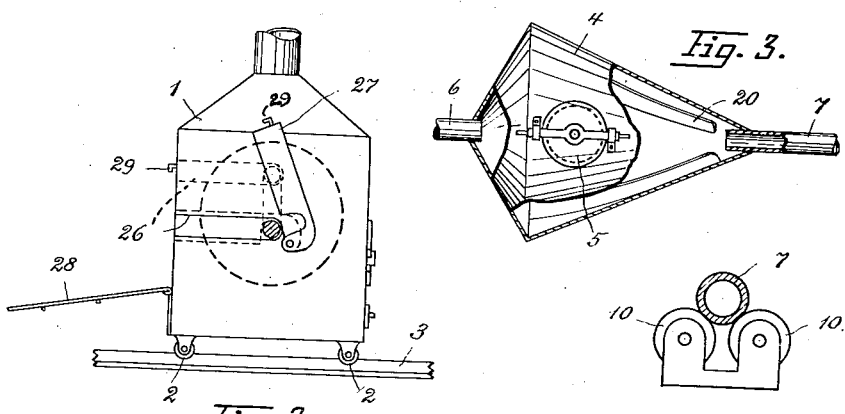
Fig. 2.
Fig. 3.
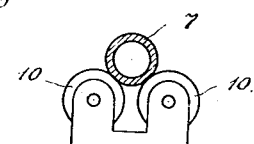
Fig. 4.
INVENTOR:
JORGE PLÜSCHKE
by Carl A. Hellmann,
Attorney.

Patented Apr. 25, 1939

2,156,192

UNITED STATES PATENT OFFICE 2,156,192

PLANT FOR WORKING MERCURY ORES

Jorge Plüschke, Mexico, D. F., Mexico

Application August 20, 1938, Serial No. 226,002
In Mexico August 21, 1937

2 Claims. (Cl. 266—18)

The invention relates to a plant for roasting mercury ores and for condensing the resulting mercury vapors so as to obtain metallic mercury. The invention has for its object to provide a plant which is easily transportable and dismountable so that it may be used at the places where the ores are found. Another object of the invention is to provide a plant in which the mercury vapors produced by the roasting are condensed in a water cooled coil rotating in a relatively small tank using very little running water, which is generally scarce at the location of the ore.

The invention is illustrated in the accompanying drawing, in which:

Figure 1 represents the complete plant.

Figure 2 is a side view of the furnace.

Figure 3 shows, partially in cross section, the pear-shaped roasting drum.

Figure 4 shows a roller bearing for the axle of the roasting drum.

Figure 5 illustrates a different construction of the condensing coil.

As shown in Figure 1, the plant comprises a furnace 1, preferably of square shape, which may be heated with wood, coal or any other available fuel. This furnace is mounted on wheels 2 running on rails 3.

The rotatable roasting drum 4 is a pear-shaped or double cone shaped and revolves within the furnace 1. The drum 4 is provided with a removable cover 5 or door, and on its flatter extremity with a sold shaft 6 while to its pointed extremity is fitted a hollow shaft 7. The shaft 6 is placed on a roller bearing 8 mounted on a support outside of the furnace 1 and bears with its pointed end against a fixed plate or stop 9. The hollow shaft 7 is also supported by a roller bearing 10 mounted at a higher level than the bearing 8, giving thereby the drum 4 an inclined position in order to enable the mercury vapors to escape through the hollow shaft 7 connected with the elevated extremity of the drum.

By a T-coupling 11, the hollow shaft 7 is connected both with a pipe coil 12 and with a solid shaft 13 resting on another roller bearing 14 and forming the continuation of the shaft 7. The coil 12 is cone-shaped, with an open extremity at its widest circumference, and attached to the shaft 13 by means of braces 30. The lower horizontally extending part of the coil immerges in a water tank 15 having an inclined bottom where the condensed mercury issuing in form of drops from the open end of the coil collects and from where it is withdrawn through a pipe 16 with cock 17. The water tank 15 is further provided with a stand pipe 18 for controlling the water level and preventing the minute quicksilver pearls floating on the water surface before cohering and sinking to the bottom, from being swept away by overflowing water. The shaft 13 carries at its end a worm gear 19 for slowly rotating the roasting drum 4.

In Figure 5, the hollow shaft or pipe 7 is bent itself so as to form the coil 12, avoiding thereby the use of the shaft 13 and the bearing 14. The worm drive 19 may in this case be installed at any place on said shaft 7.

The drum 4, provided on the inside with longitudinal ribs 20 for shifting the ore, is charged by means of a bucket 21 suspended from a braced member 22 sliding by means of grooved wheels 23 along a rail 24 provided with a stop 25. On reaching this stop 25, the bucket 21 is detained just above the door 5 of the drum 4 and unloaded through its sliding bottom.

For loading and emptying the drum 4, the furnace 1 is withdrawn along the rails 3. The shafts 6 and 7 pass through slots 26 provided in the sides of the furnace and which may be closed again by pivoted covers 27 after the drum 4 has entered the furnace. The back side 28 of the furnace is hinged near the bottom and is let down for removing the furnace. Upon raising it again, it is held in position by hooks 29 provided on the covers 27.

Obviously, different changes may be made in the construction of the parts composing the plant described without departing from the spirit of the invention.

What I claim is:

1. A plant for working mercury ores, comprising a drum for receiving the ore, a furnace for roasting the ore contained in said drum, shafts forming the axle of said drum fitted to its extremities and supported at different heights so as to give the drum an inclined position, the shaft issuing from the higher extremity of the drum being hollow, a water-cooled coil connected with said hollow shaft and rotating with it and having its outer end open for discharging the condensed mercury vapors in form of mercury drops, and means for rotating the axle of the drum.

2. A plant for working mercury ores, comprising a pear-shaped drum for receiving the ore, a shaft fitted to each extremity of said drum and supported by bearings mounted at different heights so as to give the drum an inclined position, the shaft connected to the higher extremity of the drum being hollow and providing an escape for the mercury vapors, a water-cooled conical coil surrounding and being connected with said hollow shaft and having its outer end open for discharging the mercury, a furnace mounted on wheels and adapted to receive the drum for heating it and to be withdrawn from it, means for rotating the drum, and means for loading the drum after the furnace has been retired.

JORGE PLÜSCHKE.